H. C. WILLIAMSON.
METAL CUTTING BAND SAW.
APPLICATION FILED MAR. 8, 1913.
1,233,430.
Patented July 17, 1917.
4 SHEETS—SHEET 1.
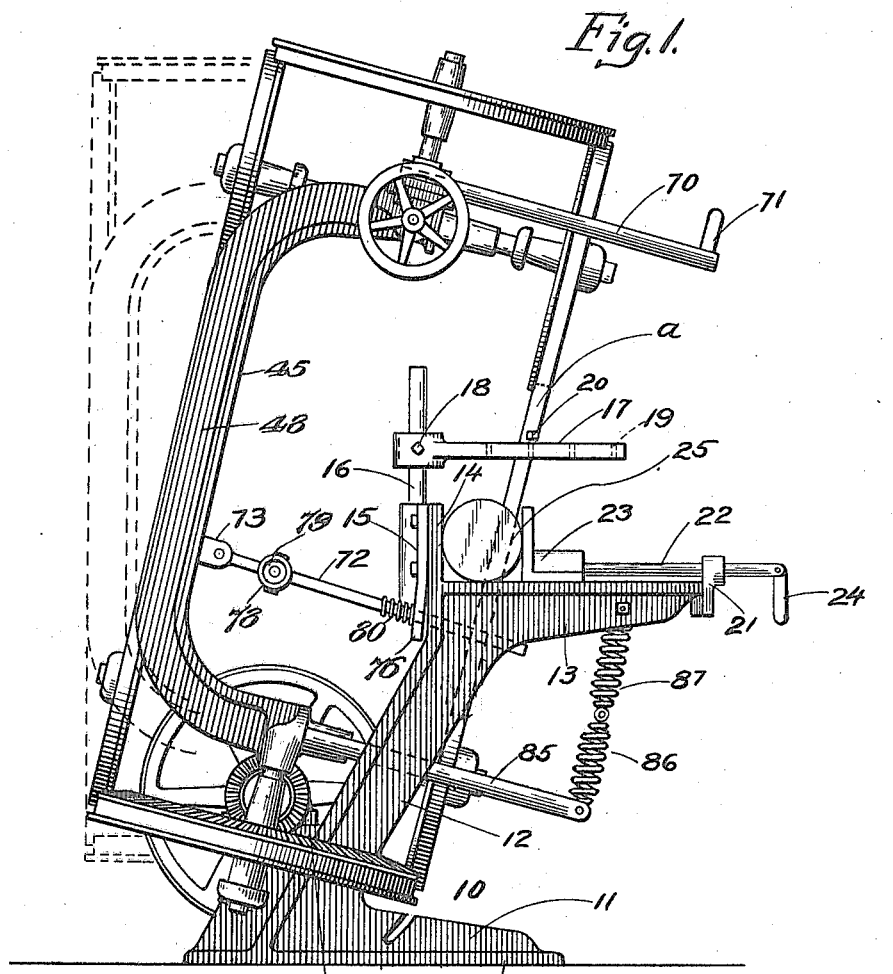
Witnesses:
O. C. Burnap
Henry A. Parks
Inventor:
Herbert C. Williamson
By Sheridan, Wilkinson, Scott & Richmond Att'ys

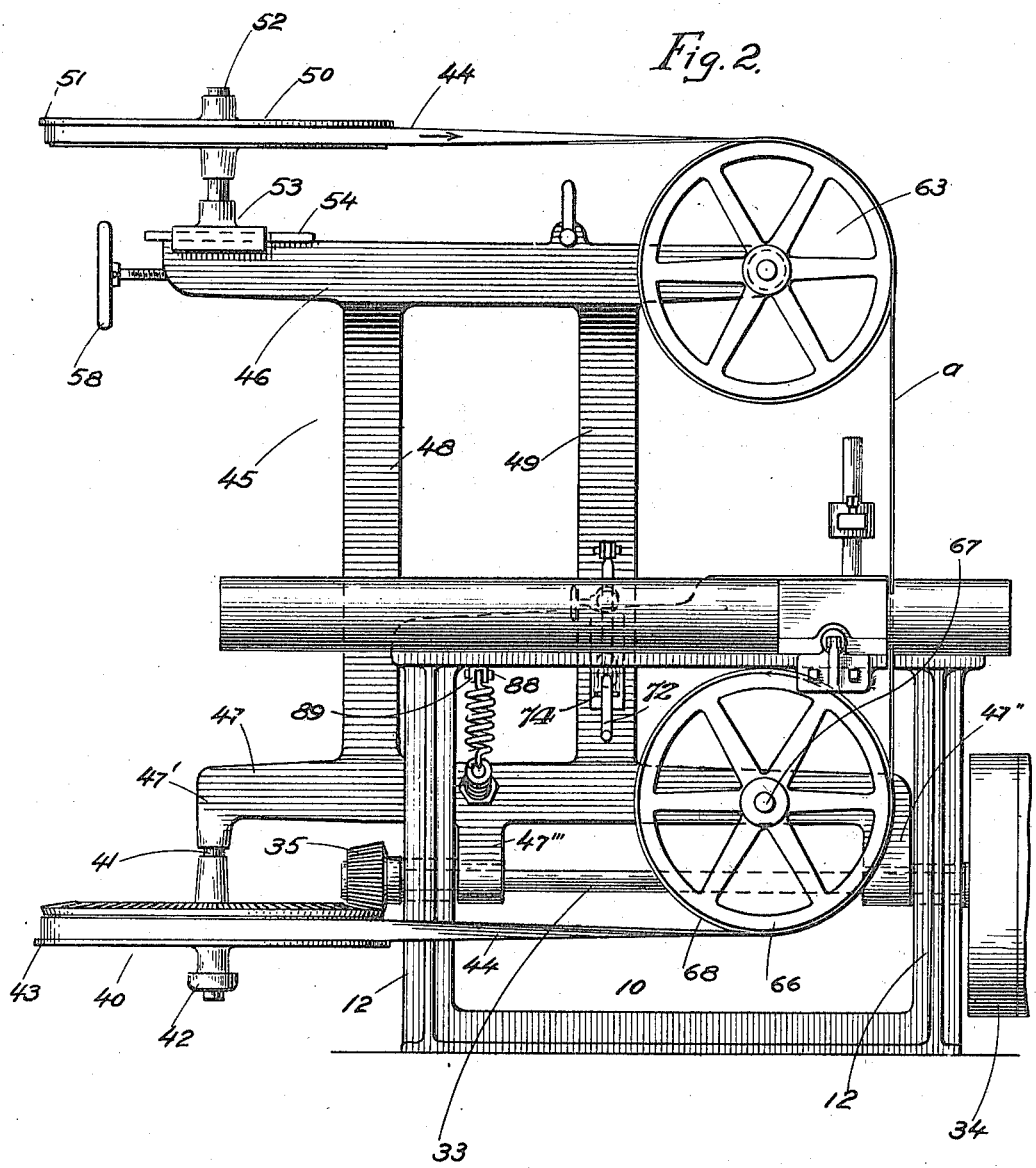

H. C. WILLIAMSON.
METAL CUTTING BAND SAW.
APPLICATION FILED MAR. 8, 1913.
1,233,430.
Patented July 17, 1917.
4 SHEETS—SHEET 3.
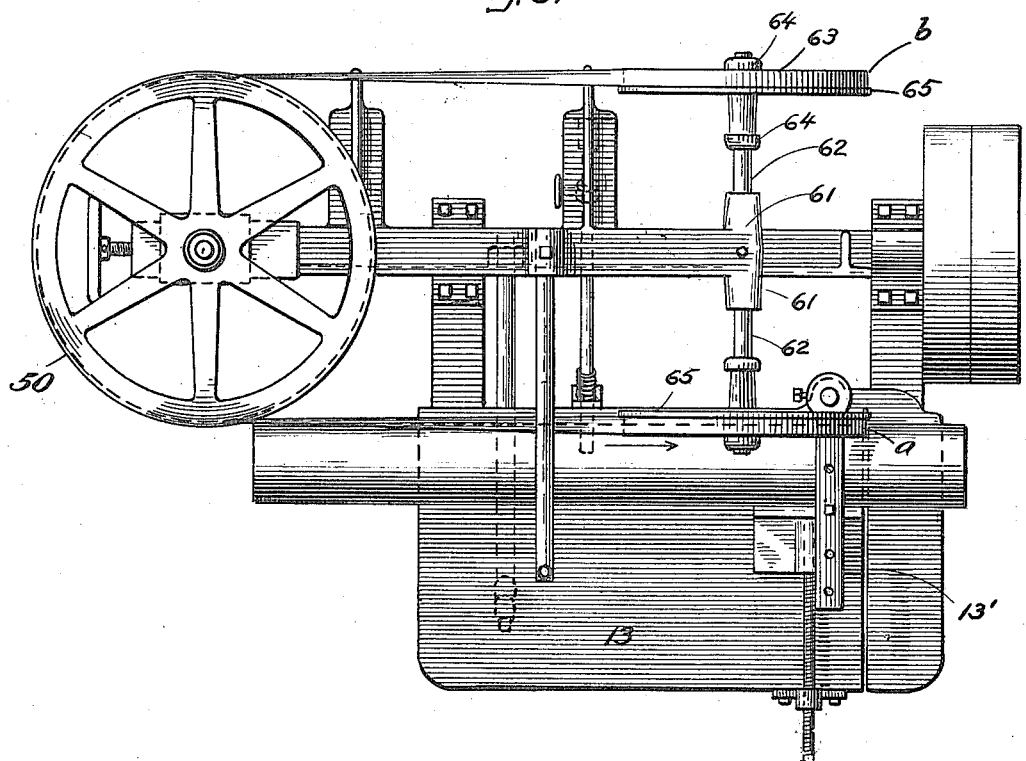
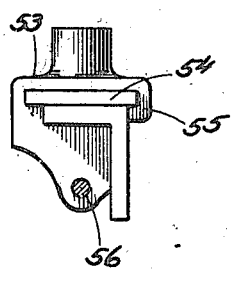
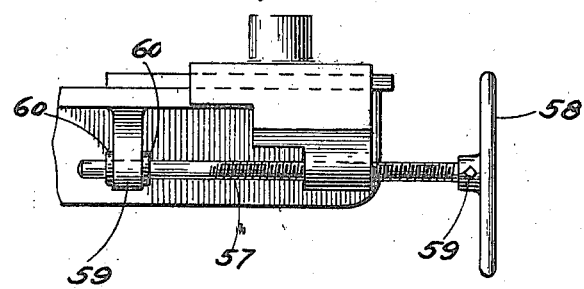
Witnesses:
Inventor:
Herbert C. Williamson
By Sheridan Wilkinson Scott & Richmond Attys

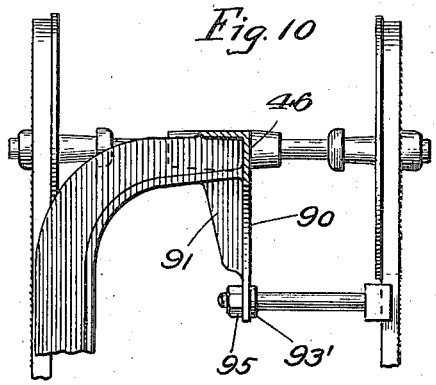
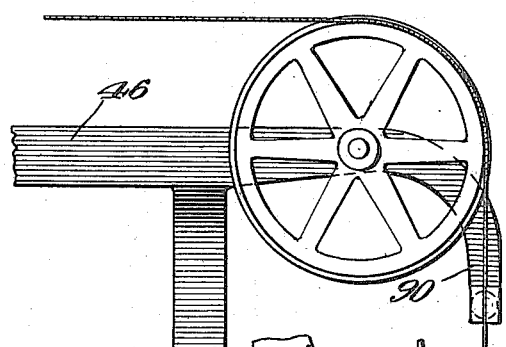
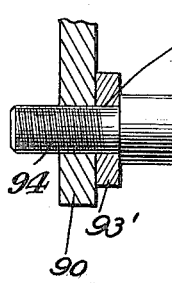
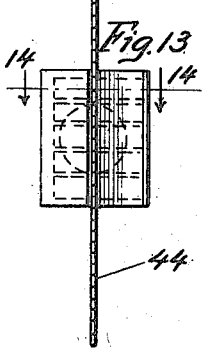
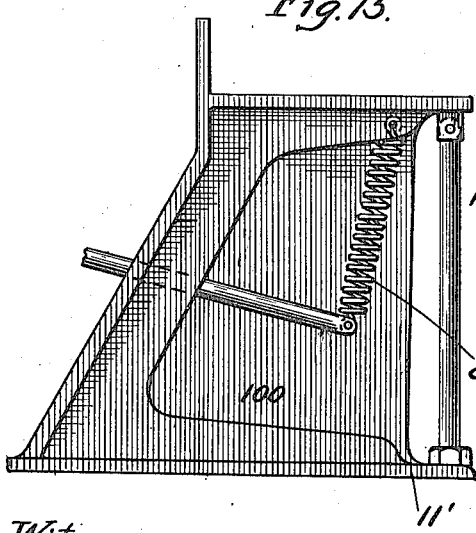
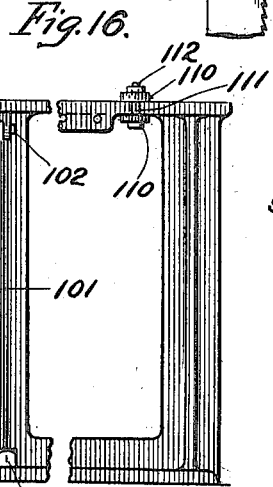
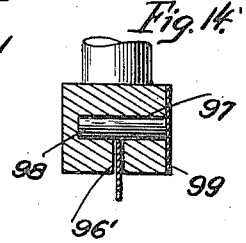

UNITED STATES PATENT OFFICE.

HERBERT C. WILLIAMSON, OF CHICAGO, ILLINOIS.

METAL-CUTTING BAND-SAW.

1,233,430.  Specification of Letters Patent.  Patented July 17, 1917.

Application filed March 8, 1913. Serial No. 752,898.

*To all whom it may concern:*

Be it known that I, HERBERT C. WILLIAMSON, a citizen of the United States, residing at Chicago, in the county of Cook and State of Illinois, have invented certain new and useful Improvements in Metal-Cutting Band-Saws, of which the following is a specification.

This invention relates to improvements in metal cutting band saws, and has for its object to provide an improved form of metal cutting band saw which will be capable of use for cutting metal stock, or other material, of practically any thickness. Hitherto the majority of stock cutting has been done by reciprocating hack saws which are mechanically impracticable, as is well-known in the trade. Band saws of conventional construction have been used for cutting wood and similar soft materials, but have proved impracticable when used for metal cutting, in view of the fact that the ordinary wood cutting band saw is simply mounted upon two spaced apart vertical pulley wheels, so that the length of material to be cut off is limited by the diameter of the pulley wheels, and the cutting of long stock is impossible without making a double cut, that is to say, cutting a section out of the stock by using both portions of the saw. Furthermore, this type of band saw has required moving of work against the band, requiring considerable power when the material is heavy and also tending to break the saw or the teeth thereof. Other forms of band saws have necessitated sharp twisting of the band adjacent the cutting point, thus tending to destroy or shorten the life of the saw. My device is capable of cutting off stock from material of any length and of practically any width, as will be obvious from the following description.

Another object of my invention is to provide an improved device of the class described which will automatically feed itself across the material when the latter is being cut, and which will prevent the saw mechanism from traveling too far at the completion of the cut should an operator not be at hand.

Still another object of my invention is the arrangement and construction of means to guide and support the saw near the cutting point thereof.

Other objects will be made apparent and set forth in the following specification and accompanying drawings, in which—

Figure 1 is a side elevation of my improved machine, showing the saw guiding means broken off.

Fig. 2, a front elevation of the same;

Fig. 3, a plan view;

Fig. 4, a detail of the frame mounting;

Fig. 5, a detail of the frame check;

Fig. 6, a plan view of the same;

Fig. 7, a detail partially in section of the drive shaft mounting.

Fig. 8, a detail of the band saw tightening means;

Fig. 9, an end elevation of the same.

Fig. 10, an end elevation partially in section, of the saw guiding means;

Fig. 11, a side elevation of the same;

Fig. 12, an enlarged side elevation of a detail of the same;

Fig. 13, an end elevation of the latter;

Fig. 14, a cross-section along line 14—14 of Fig. 13;

Fig. 15, a side elevation of a modification of the tilting frame retarding means and table; and Fig. 16, a front view of the same.

Like numerals refer to like elements throughout the drawings, in which—

10 designates generally what I term the fixed supporting frame having the base pedestals 11 from which supporting braces 12 extend upwardly, as shown in Figs. 1 and 2. These braces 12 are inclined slightly—as shown—and carry at their upper portion, and are preferably formed integral with, a horizontal work-carrying table 13. This table is provided with the upwardly extending shoulder 14 at one edge, to the rear side of which is secured a detachable bracket 15 from which extends upwardly an arm 16. On this arm 16 is adjustably mounted a clamping arm 17 adapted to be secured in adjusted position on the arm 16 by a set screw 18. The arm 17 overhangs and is parallel to the surface of the table 13, and is provided with the threaded apertures 19 in which is adapted to thread a set screw 20 to engage work carried by said table and secure the same clamped at the top, if so desired. A bearing bracket 21 is located at the front edge of the table 13 and is threadably engaged by the rod 22 which is rotatably, but not reciprocably, mounted in the clamping jaw 23. At its outer extremity the rod 22 carries the operating handle 24 pivotally mounted thereon. The operation of this clamping means being well known in the art, it is not believed necessary to further describe the construction thereof.

In Fig. 1, I have shown a round bar 25 carried upon the face of the table 13 and held in place against the shoulder 14 by the clamping jaw 23. Intermediate the extremities of the legs 12 are provided shoulders 27 upon which are secured, by screws 28, the bearing member 29, shown in Figs. 1 and 4. The bearing member 29 carries a sleeve member 30 and is apertured at 31, as indicated by dotted lines in Fig. 7, and also has a slightly reduced portion 32 extending outwardly at one side thereof upon which is journaled the elbow 47''', see Figs. 2 and 7. This shouldered member 30 is apertured throughout its length. A pair of these bearings is provided to coact with each of the bearings 29, as shown most clearly in Fig. 2. A drive shaft 33 extends through and is journaled in the bearing members 30 and is provided at one extremity outwardly of said adjacent member with a driving pulley 34 mounted thereon and adapted to be driven by a belt, or etc. At its other extremity the drive shaft 33 carries secured thereto a beveled gear 35 outwardly of the adjacent bearing 29, as shown in Fig. 2 of the drawings. A pulley wheel 40 located in approximately horizontal position when the saw is in inoperative position, is rotatably mounted on a fixed spindle or trunnion 41, being held in place thereon by the retaining collar 42, as shown in Figs. 1 and 2. This pulley 40 is provided at one end with a peripheral flange 43 adapted to restrain the band saw 44 from slipping off.

45 designates generally what I term the tilting saw frame, and comprises a pair of horizontally disposed portions 46 and 47, upper and lower, respectively, and a pair of curved portions 48, 49 extending between said horizontal portions, as shown in Figs. 1 and 2. These portions 48 and 49 are curved, as shown in Fig. 1, to permit the tilting frame to swing over the table without contacting therewith. The spindle 41 is secured to and depends from the annular elbow 47' and portion 47 of the frame 45. At its other extremity the portion 47 is provided with the downwardly extending elbow 47'' apertured to fit over and rotate upon the portion 30 of one of the bearings 29. Intermediate of this extremity and the elbow 47'' is the downwardly extending elbow 47''' suitably apertured to be mounted upon and rotate upon the portion 30 of corresponding bearing 29. Near one extremity of the portion 46 of the frame 45 is the horizontally disposed pulley wheel 50 having the peripheral flange 51, and located with its axis approximately coincidental with the axis of pulley wheel 40. This pulley 50 is rotatably mounted upon the fixed spindle 52 which in turn is supported by the slidable bracket 53. This bracket is slidably mounted upon the bearing plate 54 secured to the upper surface of cross frame portion 46 and projects outwardly on either side thereof, as shown in Fig. 9. The sliding bracket 53 is provided with an overturned flange 55 embracing one overlapping side of plate 54. The bracket 53 at its other side extends around the overlapping side of plate 54 beneath the cross frame portion 46, and is provided with the threaded aperture 56, as shown in Fig. 9. A threaded rod 57 engages the threaded aperture 56 and is provided at one extremity with the operating handle 58 secured thereto by set screw 59. Adjacent its other extremity the rod 57 is mounted in the depending lug 59 of cross frame portion 46 and is prevented from reciprocation with respect thereto by the collars 60 located on either side of the lug 59 and secured to the rod 57.

It will be apparent that upon rotation of the wheel 58 the bracket 53 and fixed spindle 52 will be moved in the direction desired, thereby increasing or decreasing the tension in the band saw 44. Located adjacent the other extremity of portion 46 and disposed horizontally is the bearing 61 in which is secured the fixed spindle 62 projecting outwardly therefrom at opposite sides a considerable distance, as is shown most clearly in Fig. 3. A pulley wheel 63 is rotatably mounted at each extremity of the spindle 62 and is retained in place thereon by the spaced collars 64, or etc. These pulleys 63 are located in approximately vertical planes when in operative position and are also provided with the peripheral flanges 65. A pair of vertically disposed pulleys 66 are similarly supported upon fixed spindle 67 projecting horizontally from the cross frame portion 47 and are preferably located below and in the same planes with the upper pulley wheels 63. These pulley wheels 66 are also preferably flanged as at 68. The saw is mounted as shown in Figs. 1, 2 and 3 to travel preferably in the direction indicated by the arrows, and it will be noted that the travel is from the far side of the driving pulley 40, as viewed in Fig. 2, to the corresponding of pulleys 66, to corresponding of pulleys 63, back around the far side of pulley 50, as viewed in Fig. 2, around the latter to and partially around the nearer of pulleys 63, and down to and partially around the nearer of pulleys 66, as viewed in Fig. 2.

It will be noted that a quarter twist is imparted to the saw band when leaving and when approaching band pulley 40 and when leaving and approaching pulley 50, these pulleys being located with their planes tangential to the peripheries of the pairs of pulleys 63 and 66, as is clearly shown in the drawings. It will be apparent that by virtue of the twists given to the saw band, the runs or portions of the latter traveling between pulleys 63 and 66, indicated by letters $a$ and $b$, respectively, (see Figs. 1 and 3), will be plane portions and travel at right angles to the plane of the table 13, and by means of the twist which I impart to the band saw portion or run $a$ (see Fig. 2), will run with its toothed edge facing toward the observer, as viewed in Fig. 2, as is necessary for the cutting of the bar or other material 25. The portion or run $b$ of the band saw will be located with its teeth facing the opposite direction, although it may be reversed if so desired. The table 13 is provided with a slot 13' in which the portion $a$ of the saw is adapted to travel (see Fig. 3). An arm 70 extends toward the operator from the cross frame portion 46 and is provided with a handle 71. A check rod 72 is pivotally mounted at one extremity to the lug 73 carried by a frame portion 49. This check rod is provided with the cross pin 74 adjacent its outer extremity and is mounted in a slot 75 in the downwardly extending strip 76, which in turn is secured by bolts, or etc. 77, to the shoulder 14. The strip 76 extends downwardly below the under surface of the table, as shown in Figs. 1 and 5. On the opposite side of the strip 76 from the pin 74 is the adjustable collar 78 adapted to be held in adjusted position by the screw 79. A spring 80 is coiled around the rod 72 between the strip 76 and collar 78. It will be apparent that by adjusting the collar 78, the travel of the tilting frame and consequently the cutting portion or run $a$ of the saw may be limited as desired, the spring 80 serving to cushion the saw and frame when such limit of travel is reached.

I preferably construct the portions 48 and 49 of the saw frame curved—as shown—to permit their clearance of the table and work supporting portion of my machine when the saw frame is tilted over. Furthermore, the whole construction is preferably designed with a view of locating the center of gravity of the tilting mechanism so that the weight of the latter will operate to feed the saw across the work, and after having been started thereon by tilting the tilting frame over, through the medium of arm 70 and handle 71, to counteract the increasing force exerted as the center of gravity moves over, I provide a fixed arm 85 projecting outwardly from the cross portion 47 of the tilting frame. This fixed arm has pivotally secured at its outer extremity one end of a coil spring 86, the other end of which is pivotally linked to one end of a second similar spring 87, which in turn has its upper end pivotally linked to a pin 88 carried between lugs 89 in the under surface of the table 13. It will be apparent that as the center of gravity is moved toward the table, the pressure exerted upon the cutting portion or run $a$ of the saw will be normally increased, but as a predetermined point is reached the springs 86 and 87, acting through the arm 85, tend to balance or counteract a portion of the weight of the tilting frame, this counterbalancing force increasing as the center of gravity is further displaced.

It will be obvious that while I have shown two coiled springs, I may use a single spring, 86', as shown in Fig. 15, although I find that by the use of the double spring shown the counterbalancing effect does not take place until a certain point in travel is reached but when it is exerted, it is exerted with greater strength than by the use of a single spring since I may use comparatively stiff springs.

It will be apparent that plane portions or runs $a$ and $b$ of the saw will lie in substantially the same plane in the form of my device illustrated, and it will be further apparent that the length of work to be cut is unlimited and that the thickness of metal or work to be cut is only limited by the possible interference of the portion $b$ of the saw. This limit may be increased by increasing the size of the pulleys 40 and 51, as is obvious. Should the band saw become slack, the tension therein may be increased by operation of the adjusting rod 57 through the medium of wheel 58.

Inasmuch as the saw is liable to buckle and be forced back from the work, I find it desirable to provide means to overcome these actions, as is shown in Figs. 10 to 14, where 90 designates an integral arm depending from adjacent one extremity of tilting frame portion 46. A strengthening web 91 extends between and is joined integrally with arm 90 and frame portion 46. The lower extremity of arm 90 is apertured at 92 and the reduced threaded end 94 of a rod 93 is inserted therethrough and secured in place by a nut 95 at one side, and a washer, 93', at the other. This rod 93 carries at its outer extremity a block 96, vertically slotted at 96'. Cross holes 97 extend from one side of block 96 partially therethrough and transversely intersect slot 96', as shown in Fig. 14. Hardened metal rollers 98 are rotatably mounted in these holes, and are held therein by the plate 99 secured to the face of block 96. The block 96 is located not far above the table, and the portion "$a$" of the saw band runs in the slot 96' with its rear or untoothed edge adapted to contact with rollers 98 when cutting work, whereby the edge of the saw-band will not become roughened and worn, and friction will be greatly reduced. The sides of the slot 96' serve to prevent turning of the saw band when cutting.

When work or material of considerable weight is to be cut, I find it desirable to afford additional supporting and strengthening means for the table 13, as shown in Figs. 15 and 16. I extend the web 100 outwardly from one of the braces 12 as shown, to furnish a rigid support. Adjacent the other end of the table, I provide a leg 101 reduced at its upper end and pivotally supported by the pin 102 between lugs 103 depending from the table. Threadably mounted on the opposite end of leg 101, which terminates just short of the base flange 11', is a nut 104. The leg 101 is adapted to be swung clear of base flange 11' when the saw band is to be placed in position or removed therefrom, after which it is dropped to position shown, and the nut 104 screwed downwardly to contact with the base of flange 10'.

To reinforce the table 13 where slotted, a pair of washers 110 are located one above and one beneath the table as shown in Fig. 16, and a bolt 111 is inserted therethrough and clamps them together by means of the threaded nut 112 carried thereby.

Further explanation of the operation of my improved device is believed to be unnecessary. It is to be noted that while I have shown and described my machine with more or less particularity, I do not wish to be unduly restricted thereto beyond the scope of the appended claims.

What I claim is:

1. In a device of the class described, an endless saw band, said band being provided with a cutting edge, a saw driving and supporting means, said saw being mounted upon said means with a pair of runs lying in substantially the same plane.

2. In a device of the class described, an endless saw band, said band being provided with a cutting edge, a saw driving and supporting means, said saw being mounted upon said means with a pair of runs lying in substantially the same plane, said runs having their cutting edges facing in opposite directions.

3. In a device of the class described, a table, an endless saw band, said band being provided with a cutting edge, a saw driving and supporting means, said saw being mounted upon said means with a pair of runs lying in substantially the same plane, said runs being located in a plane approximately perpendicular to said table and having their toothed edges facing in an opposite direction.

4. In a device of the class described, an endless saw band, means to support and drive said saw, said saw being mounted upon said means with a pair of runs lying in substantially the same plane, a work-carrying table, one of said runs of said saw band being located adjacent said table and adapted to move transversely relative to said table.

5. In a device of the class described, a work-carrying table, a band saw, a saw supporting and driving means, said band saw being supported upon said means with a pair of runs lying in approximately the same plane, one of said runs being located adjacent to said table and adapted to be moved thereacross.

6. In a device of the class described, a work-carrying table, a band saw, a saw supporting and driving means, said band saw being supported upon said means with a pair of runs in approximately the same plane, one of said runs being located adjacent said table and adapted to be moved thereacross, and means to secure work or material to be cut upon said table.

7. In a device of the class described, a fixed frame, a table carried by said frame, a tilting frame pivotally mounted upon said fixed frame, saw carrying and driving means carried by said frame, a band saw mounted upon said means with a pair of runs in a plane approximately perpendicular to that of said table, said tilting frame being adapted to tilt to move one of said portions across said table when cutting work.

8. In a device of the class described, a fixed frame, a work-carrying table carried by said frame, a tilting frame pivotally mounted upon said fixed frame, saw carrying and driving means mounted upon said tilting frame, a band saw mounted on said means with a pair of runs lying in a plane substantially perpendicular to the plane of said table, the run of said saw adjacent said table being mounted with the toothed edge thereof toward said table, whereby when said tilting frame is tilted said cutting edge of said last-named portion will be moved across said table to cut work carried thereby when said saw is running.

9. In a device of the class described, a fixed frame, a work-carrying table carried by said frame, a tilting frame pivotally mounted upon said fixed frame, saw carrying and driving means mounted upon said tilting frame, a band saw mounted on said means to run with runs thereof spaced apart and in a plane substantially perpendicular to the plane of said table, the run of said saw adjacent said table being mounted with the toothed edge thereof facing toward said table, whereby when said tilting frame is tilted said cutting edge of said last-named run will be moved across said table to cut work carried thereby when said saw is running, and means to limit the movement of said tilting frame in either direction, said means being adjustable to vary amount of cutting travel.

10. In a device of the class described, a fixed frame, a work-carrying table carried by said frame, a tilting frame pivotally mounted upon said fixed frame, saw carrying and driving means mounted upon said tilting frame, a band saw mounted on said means to run with runs thereof spaced apart and lying in a plane substantially perpendicular to the plane of said table, the run of said saw adjacent said table being mounted with the toothed edge thereof facing toward said table, whereby when said tilting frame is tilted said cutting edge of said last-named run will be moved across said table to cut work carried thereby when said saw is running, and means to gradually check the movement of said tilting frame when being moved across said table in cutting operation.

11. In a device of the class described, a fixed frame, a work-carrying table carried by said frame, a tilting frame pivotally mounted upon said fixed frame, saw carrying and driving means mounted upon said tilting frame to run with runs thereof spaced apart and lying in a plane substantially perpendicular to the plane of said table, the run of said saw adjacent said table being mounted with the toothed edge thereof facing toward said table, whereby when said tilting frame is tilted said cutting edge of said last named run will be moved across said table to cut work carried thereby when said saw is running, adjustable means to limit the movement of said tilting frame in either direction, and a second means to gradually check the movement of said tilting frame when moving across said table in cutting operation.

12. In a device of the class described, a fixed frame, work-carrying means carried by said frame, a tilting frame pivotally mounted upon said fixed frame, a saw carrying and driving means carried by said tilting frame, said tilting frame being mounted so that the center of gravity thereof will lie on one side of said pivotal mounting when in inoperative position and on the other side of said pivotal mounting when in operation.

13. In a device of the class described, a fixed frame, a work-carrying table carried by said frame, a tilting frame pivotally mounted upon said fixed frame, saw carrying and supporting means carried by said tilting frame, a band saw carried upon said means to run with runs spaced apart and in a plane perpendicular to the plane of said table, one of said runs being adjacent said table and arranged to run with its cutting edge toward said table, said tilting frame being adapted to be tilted to move said cutting run of said saw across said table, said tilting frame and saw carrying means being located so that the center of gravity thereof will lie on the side of said pivotal mounting opposite to said table when in inoperative position and upon the same side as said table when in operation, whereby said cutting run of said saw will be fed automatically across said table by the weight of said tilting frame and saw-carrying means when cutting.

14. In a device of the class described, a fixed frame, a tilting frame oscillatably mounted upon said fixed frame, saw carrying and supporting means carried by said tilting frame, a band saw carried upon said means, said tilting frame being arranged to move relative to work to be cut and adapted to be fed relative to said work by gravity, and an arm, yielding means coöperating with said arm adapted to restrain movement of said tilting frame and saw after the cutting portion of said saw has been fed relative to said work a certain distance by the weight of said frame and carrying means.

15. In a device of the class described, a tilting frame pivotally mounted upon a fixed frame, said tilting frame being provided with a pair of pulley wheels horizontally disposed, one of said pulley wheels being located adjacent the top of said tilting frame and the other of said pulley wheels being located adjacent the bottom of said frame, a pair of vertically disposed pulley wheels rotatably mounted at the upper portion of said tilting frame, a second pair of vertically disposed pulleys rotatably mounted on and located adjacent the bottom of said frame, said upper vertical pulleys being tangential to the plane of said upper horizontal pulley, said lower pair of vertical pulleys being located tangential to the plane of said lower horizontal pulley, and a band saw mounted upon and to run between said pulleys.

16. In a device of the class described, a fixed frame, a tilting frame pivotally mounted upon said fixed frame, a drive shaft extending through and journaled in said pivotal mounting of said tilting frame, a saw carrying and driving means carried by said tilting frame, said means comprising a plurality of pulley wheels adapted to support a band saw with runs thereof in approximately vertical planes and spaced apart, one of said pulleys being provided with gear teeth on one side thereof, a driving pinion carried by said drive shaft and meshing with said teeth, and means to rotate said shaft and pinion and thereby said band saw.

17. In a device of the class described, an endless saw band, means to support said saw band, said means comprising a pair of spaced apart pulleys having their axes located in substantially the same plane, a second pair of pulleys spaced from and coacting with said first named pulleys and other supporting means associated with all of said pulleys to assist in supporting said saw band, the latter being arranged to cut with the run between said first pair of pulleys, said run running substantially in a plane.

18. In a device of the class described, a pair of pulley members in approximately the same plane and spaced apart, a second pair of pulley members, said members being angularly disposed with respect to said first named pulley members and arranged each in a plane tangential to one of said first named pulley members, other supporting means, and an endless saw band being arranged to cut with the run running between said first named pulley members and supported by said pulleys and supporting means.

19. In a device of the class described, an endless saw band, driving and supporting means for said saw comprising a pair of pulley members spaced apart, a second pair of pulley members angularly disposed with respect to said first named pulley members, other supporting means, said saw band running between and supported by said pulley members and being arranged to cut with the run running between said first named pulley members and supported by said pulleys and supporting means.

20. In a device of the class described, a pair of approximately vertically arranged pulley members, a pair of approximately horizontally arranged pulley members, other supporting means, and an endless saw band running between said pulley members and supported thereby, said saw band being arranged to cut with the run running between said first named pair of pulley members and supported by said second named pair of pulleys and said supporting means.

21. In a device of the class described, a tiltable frame, pulley members rotatably carried by said frame, a pair of said members being spaced apart, a second pair of said pulley members being angularly disposed with respect to said first named pair of pulley members, other supporting means, and an endless saw band running between and mounted upon said pulley members and arranged to cut with the run running between said first named pair of members, and supported by said pulleys and supporting means.

22. In a device of the class described, a pair of spaced apart pulley members located in approximately the same plane, a saw band running between and supported by said pulley members, a second pair of pulley members each located in a plane approximately tangential to one of said first named pulley members, and additional supporting means coacting with said pulleys to support said saw band, said saw being arranged to cut with the run running between said first named pulleys.

23. In a device of the class described, a pair of spaced apart pulley members located substantially in the same plane, a saw band running between and supported by said pulley members, a second pair of pulley members each located in a plane approximately tangential to one of said first named pulley members, additional supporting means coacting with said pulleys to support said saw band, said saw being arranged to cut with the run running between said first named pulleys, and means to drive said saw, said means comprising a gear carried by one of said pulleys, a pinion coacting therewith and adapted to drive the same.

In testimony whereof, I have subscribed my name.

HERBERT C. WILLIAMSON.

Witnesses:
 HENRY A. PARKS,
 E. M. ANDERSON.

Copies of this patent may be obtained for five cents each, by addressing the "Commissioner of Patents, Washington, D. C."